(No Model.)
H. W. EISENHART.
HOLDER FOR SPRING HARROW TEETH.
No. 492,349. Patented Feb. 21, 1893.
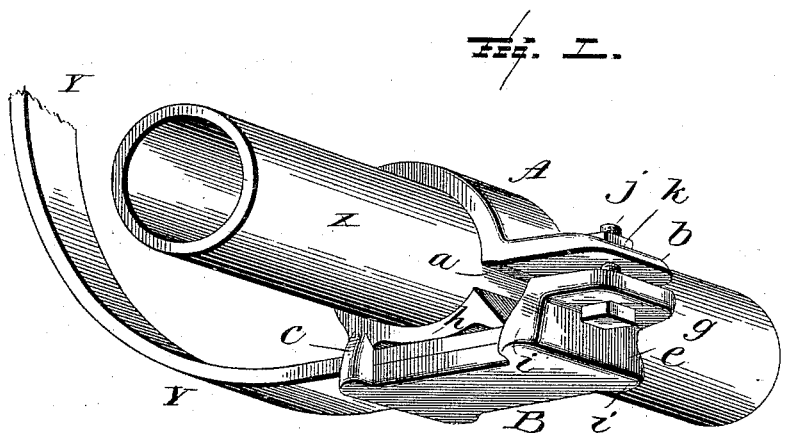
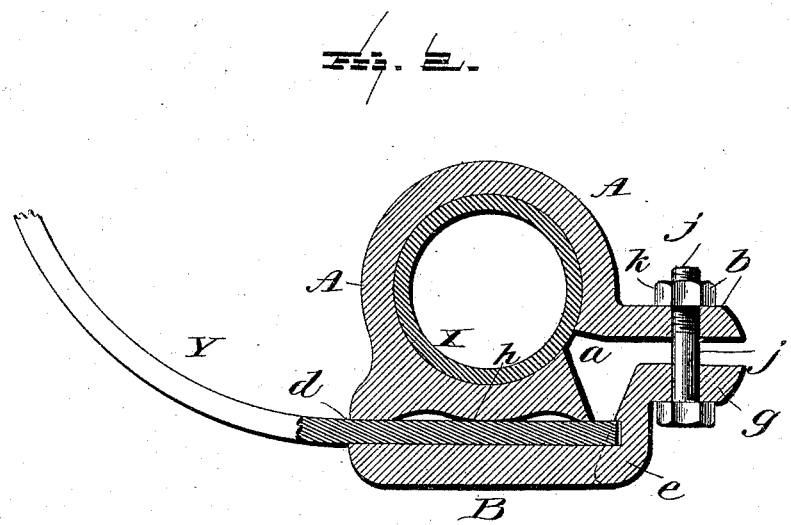

UNITED STATES PATENT OFFICE.

HENRY W. EISENHART, OF YORK, PENNSYLVANIA, ASSIGNOR TO A. B. FARQUHAR, OF SAME PLACE.

HOLDER FOR SPRING HARROW-TEETH.

SPECIFICATION forming part of Letters Patent No. 492,349, dated February 21, 1893.

Application filed January 19, 1892. Serial No. 418,572. (No model.)

*To all whom it may concern:*

Be it known that I, HENRY W. EISENHART, of York, in the State of Pennsylvania, have invented a new and useful Improvement in Holders for Spring Harrow-Teeth, of which the following is a specification.

The holder in which my invention is comprised is one intended to serve both as a holder for the tooth and as a clamp by which the tooth may be secured in place in its adjusted position upon the gas pipe or other cylindrical bearing piece usually employed as a support for the same. The holder is one in which the tooth is fastened in place in the holder and the holder itself is secured in place on its cylindrical bearing by one and the same means and at one and the same time.

The nature of my improvement can best be explained and understood by reference to the accompanying drawings in which—

Figure 1 is a perspective view and Fig. 2 is a longitudinal vertical central section of the holder.

The holder is a single casting made preferably of malleable iron.

It consists generally speaking of the split cylindrical portion or clamping ring A intended to encircle a cylindrical bearing or support, which in this instance is the tube or gas pipe X; and the clamp plate B. The clamping ring A is split or divided at $a$, and it has on one of its free ends a projecting lip or ear $b$. The clamp plate B, which is cast in one with the ring, is joined to the latter at one end by the shoulder $c$, in which is formed the slot $d$ for the entrance of the spring tooth Y, and it thence extends horizontally back to the other side of the ring, where it has a shoulder $e$; and beyond this shoulder it has a horizontal lip or ear $g$, corresponding to the lip or ear $b$ on the ring. That portion of the ring A which faces plate B has formed on it a flat bearing face for the end of the tooth, which bearing face may consist of the three projecting ribs $h$, the bearing faces of which are in the same plane. The space between the bearing face and the plate B forms the socket for the end of the tooth, which is inserted therein through the slot $d$, usually until it brings up against the solid shoulder $e$. Side guide lugs $i$ are provided at this point to insure the end of the tooth against lateral play. A bolt $j$ passes through the ears $g$ and $b$, and is secured by the nut $k$. By tightening up the nut the ears $g$, $b$, are drawn together; this draws the plate B down upon the tooth Y, and at the same time tightens and clamps the ring A upon its support X. In this simple way I am enabled at one and the same time, and by the same operation, to clamp the tooth in its holder, and the holder itself upon its support; at the same time by loosening the bolt, it is easy to adjust both the tooth in its holder and the holder upon its support.

Having now described my invention and the manner in which the same is or may be carried into effect, what I claim, and desire to secure by Letters Patent, is—

A holder for spring harrow teeth; consisting of the split clamping ring, the clamping plate fast at one end to the ring and having between it and the ring a socket to receive the end of the tooth, and means for drawing together the free end of the clamp plate and the opposite free end of the clamping ring, whereby at one and the same operation the tooth may be clamped to its holder and the holder itself may be clamped or closed upon its support, substantially as and for the purposes hereinbefore set forth.

In testimony whereof I affix my signature in presence of two witnesses.

HENRY W. EISENHART.

Witnesses:
JOHN W. BRANT,
P. W. GRUVER.